United States Patent [19]
Fujino et al.

[11] Patent Number: 5,216,687
[45] Date of Patent: Jun. 1, 1993

[54] SOLID STATE LASER DEVICE WITH A BI-CYLINDRICAL COVEXO-CONVEX LENS HAVING SELECTED RADII OF CURVATURE TO PREFERABLY PUMP A REGION OF A LASER MEDIUM

[75] Inventors: Masashi Fujino, Akishima; Seiichi Yokoyama, Ome, both of Japan

[73] Assignee: Hoya Corporation, Tokyo, Japan

[21] Appl. No.: 730,597

[22] Filed: Jul. 16, 1991

[30] Foreign Application Priority Data

Jul. 16, 1990 [JP] Japan ............................. 2-75405[U]
Jun. 17, 1991 [JP] Japan ............................. 3-45389[U]

[51] Int. Cl.$^5$ .............................................. H01S 3/10
[52] U.S. Cl. .................................... 372/70; 372/71; 372/75
[58] Field of Search ............................ 372/70, 71, 75

[56] References Cited

U.S. PATENT DOCUMENTS

| | | | |
|---|---|---|---|
| 3,735,280 | 5/1973 | Johnston, Jr. ................ | 372/75 X |
| 4,025,157 | 5/1977 | Martin ............................ | 385/33 |
| 4,739,507 | 4/1988 | Byer et al. ..................... | 372/71 X |

Primary Examiner—Akm E. Ullah
Attorney, Agent, or Firm—Oliff & Berridge

[57] ABSTRACT

A solid-state laser device which employs a bi-cylindrical lens as a focusing lens for focusing excitation light emitted from a semiconductor laser to pump a laser medium. Further, the radius of curvature of each cylindrical surface of the bi-cylindrical lens is selected such that a region of the laser medium to be pumped by a horizontal component of the pumping light and another region of the laser medium to be pumped by a vertical component of the pumping light are contained in a predetermined region of the laser medium. Thereby, output laser light which excels in transverse mode characteristics can be efficiently obtained without increasing the number of surfaces of lenses composing the focusing lens system. Moreover, there is provided a solid-state laser device which can be relatively small-sized and easily regulated.

13 Claims, 7 Drawing Sheets

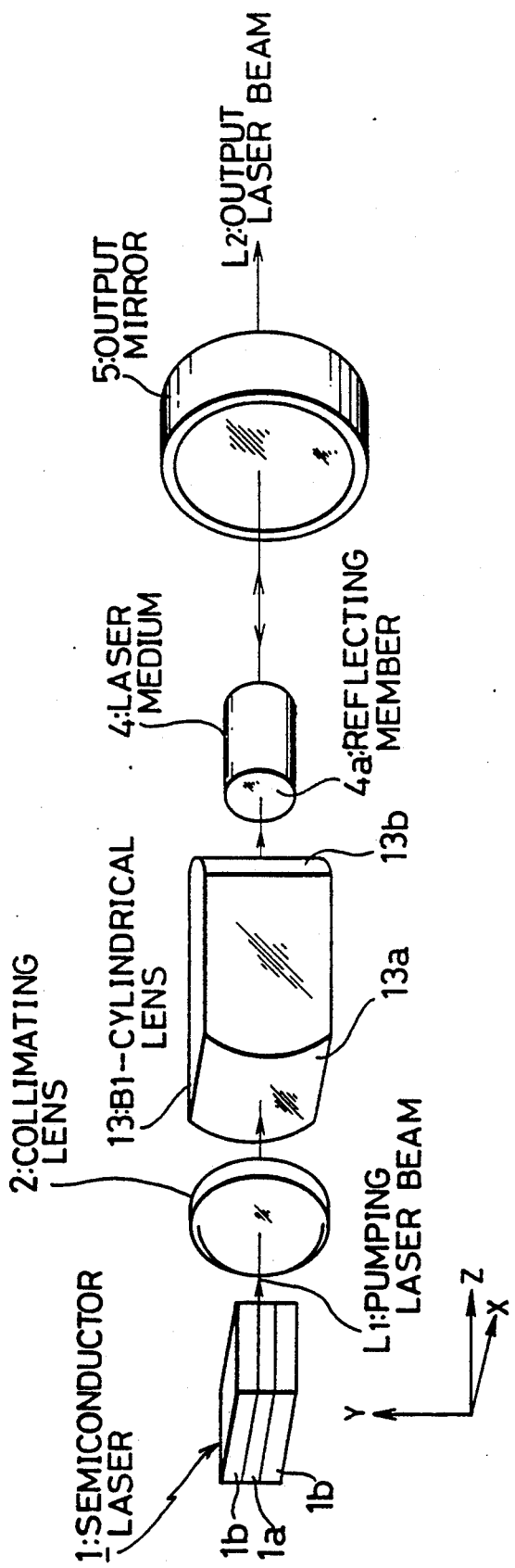

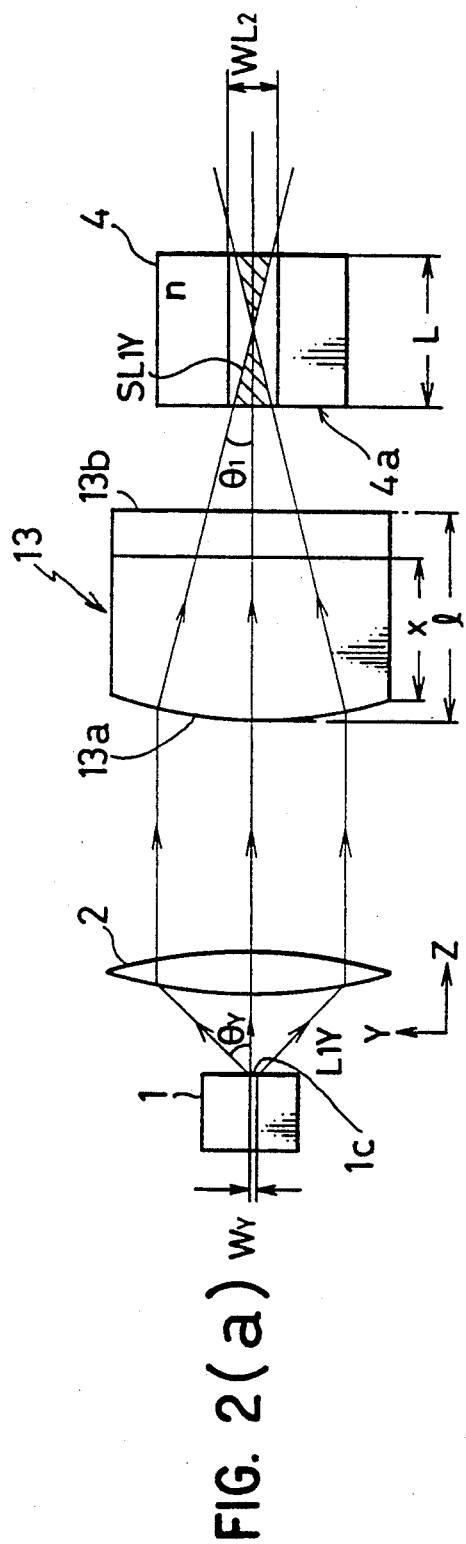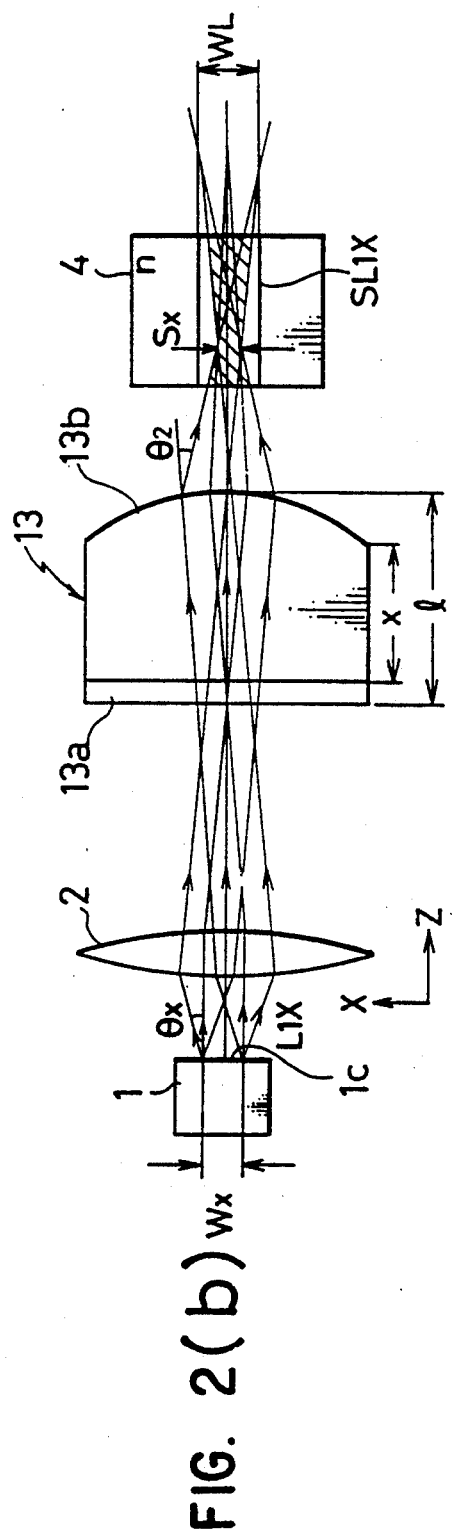
FIG. 2(a)
FIG. 2(b)

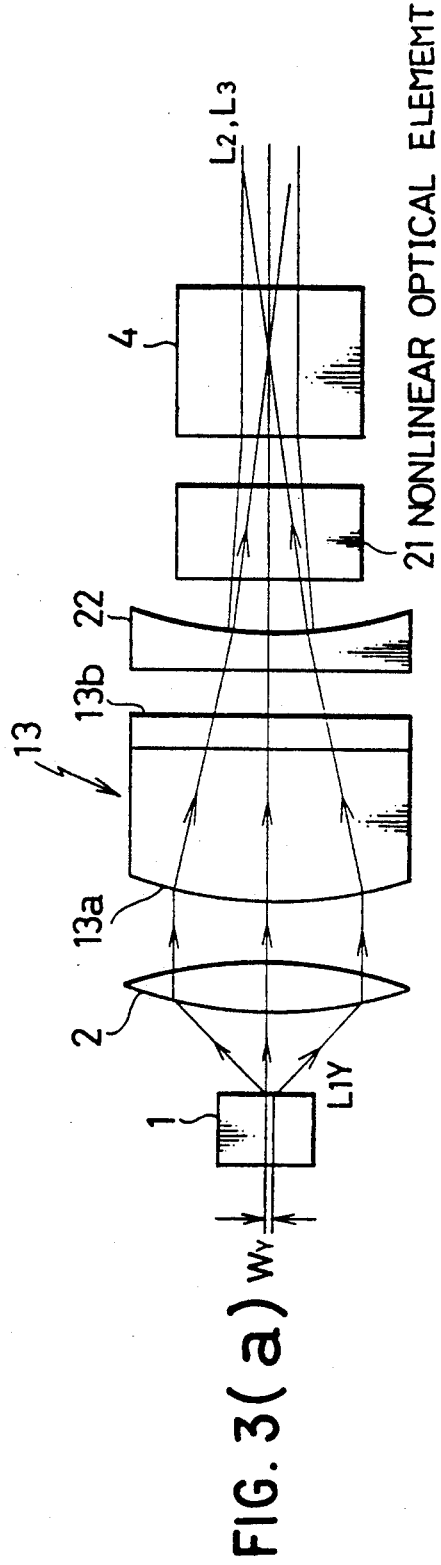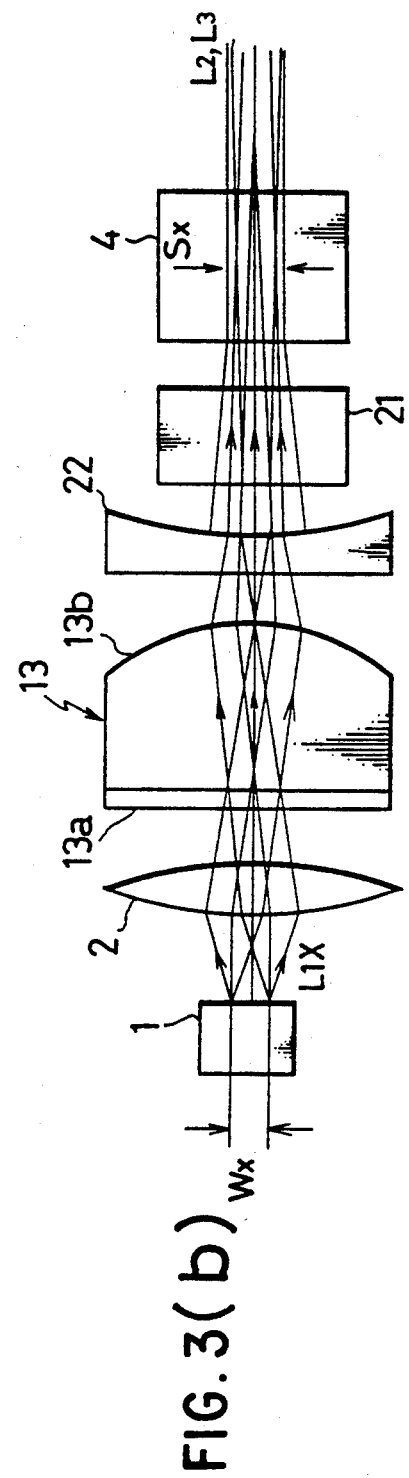
FIG. 3(a)
FIG. 3(b)
21 NONLINEAR OPTICAL ELEMENT

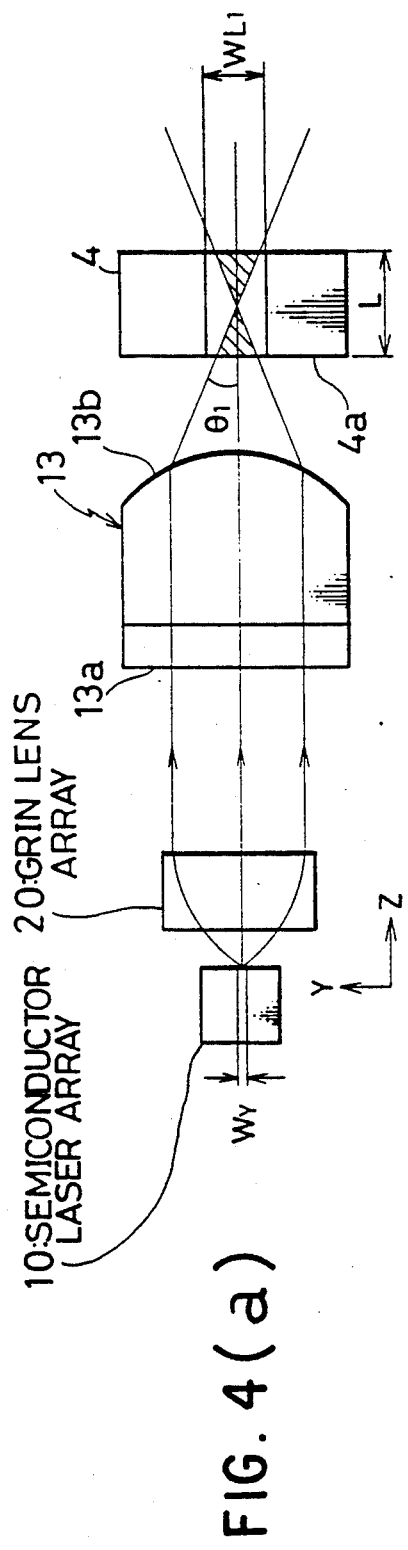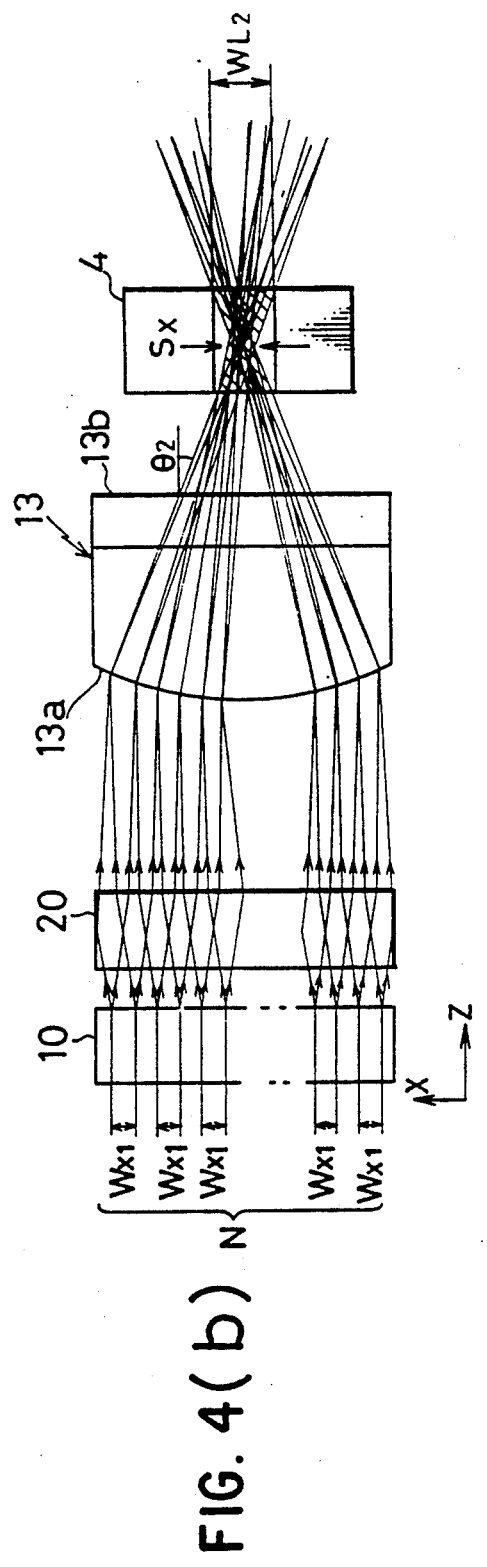
FIG. 4(a)
FIG. 4(b)

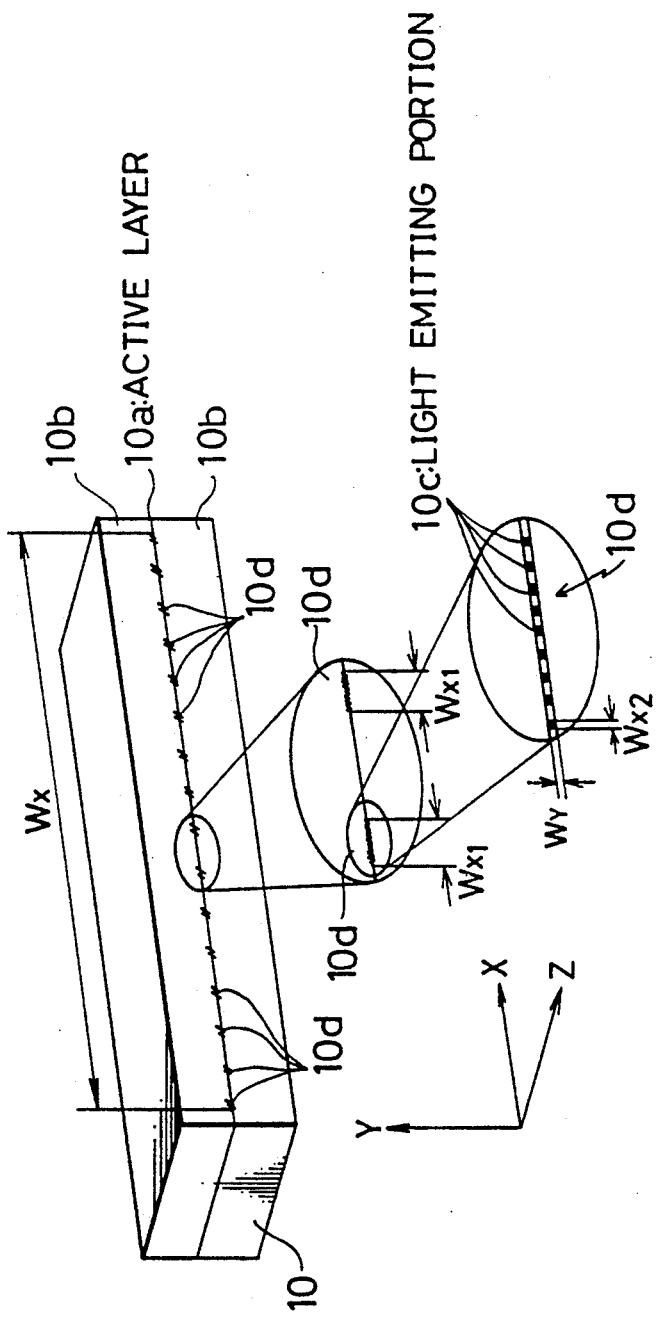

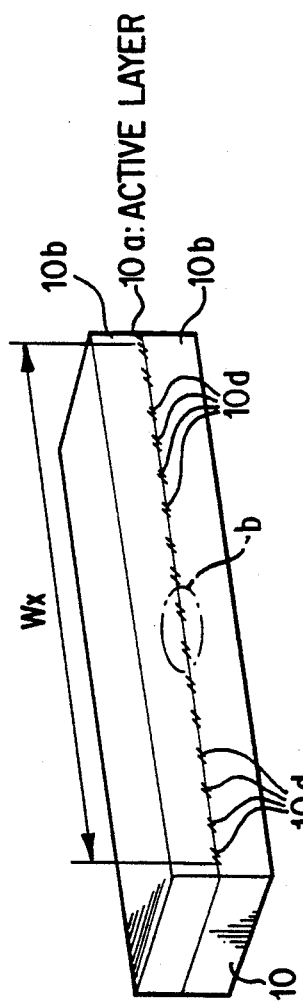
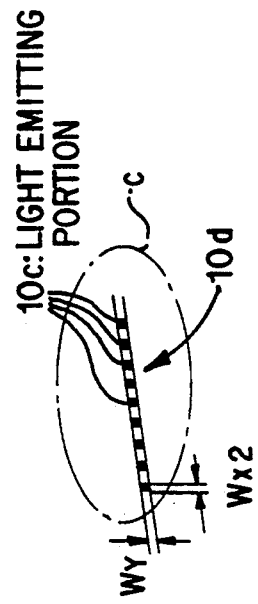
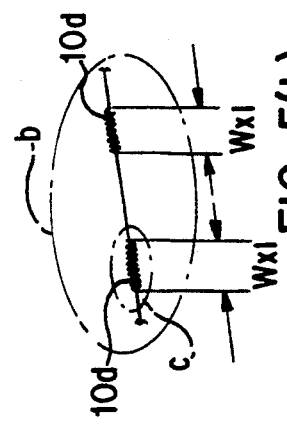

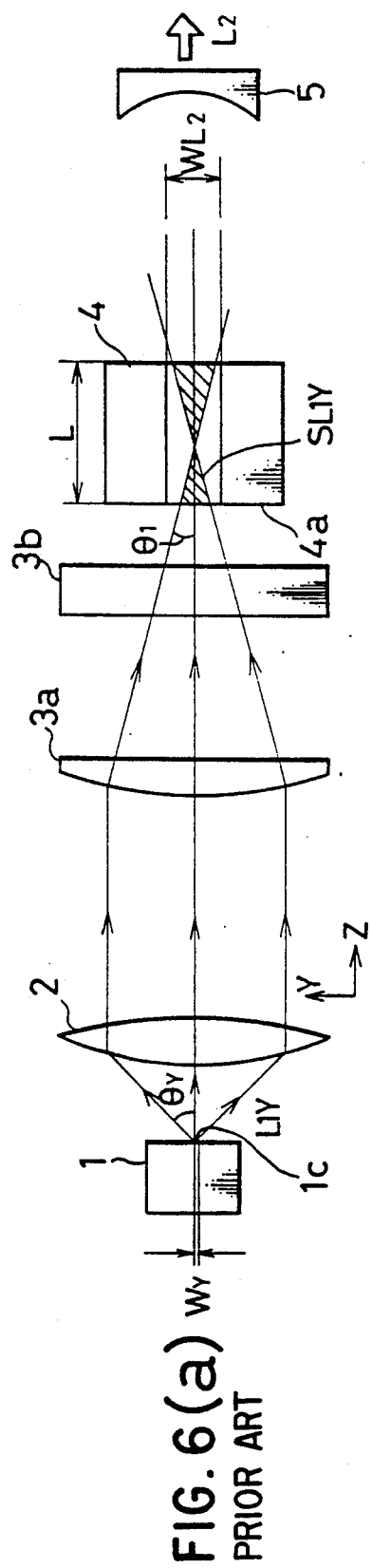
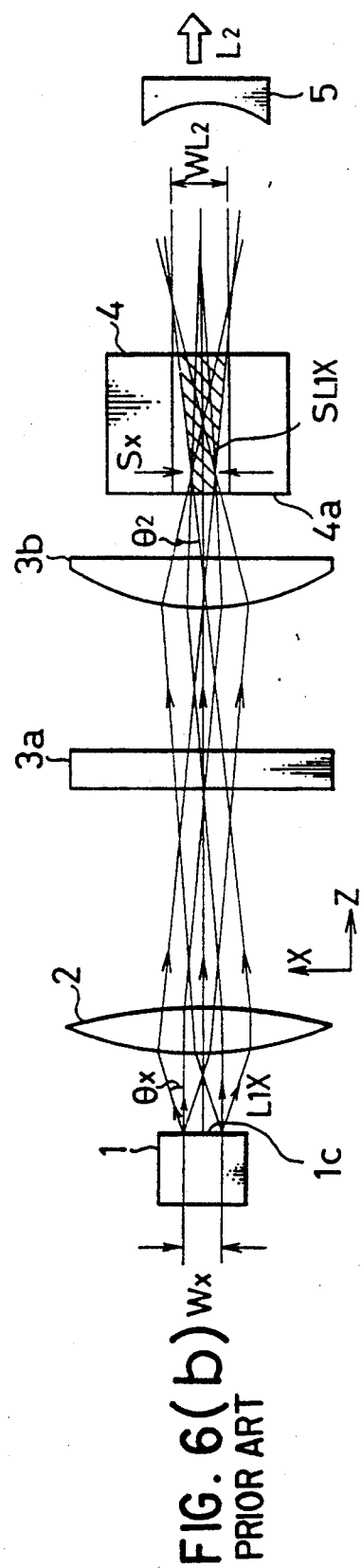
FIG. 6(a) PRIOR ART
FIG. 6(b) PRIOR ART

SOLID STATE LASER DEVICE WITH A BI-CYLINDRICAL COVEXO-CONVEX LENS HAVING SELECTED RADII OF CURVATURE TO PREFERABLY PUMP A REGION OF A LASER MEDIUM

BACKGROUND OF THE INVENTION

1. Field of The Invention

This invention generally relates to a solid-state laser device which uses laser light emitted by a semiconductor laser as excitation (or pumping) light.

2. Description of The Related Art

A typical example of a prior art solid-state laser device which uses laser light emitted by a semiconductor laser as pumping light is a laser device disclosed in Japanese Unexamined Patent Publication (Kokai Tokkyo Koho) No. 1-166581. Referring to FIGS. 6(a) and 6(b), there is illustrated an optical path of this prior art solid-state laser device. FIG. 6(b) illustrates a view of the optical path on a first plane (namely, the XZ plane (hereunder sometimes referred to simply as a horizontal plane)); and FIG. 6(a) a view of the optical path on a second plane (namely, the YZ plane (hereunder sometimes referred to simply as a vertical plane)).

As illustrated in FIG. 6, in this prior art device, light $L_1$ (of which the horizontal (X) component is represented by $L_{1X}$ of FIG. 6(b) and the vertical (Y) component is designated by $L_{1Y}$ of FIG. 6(a)) to be used for pumping (hereunder referred to simply as pumping light or semiconductor laser light) which is emitted from a semiconductor laser 1 is first changed by a collimating lens 2 into substantially parallel rays. Then, the substantially parallel rays are focused by cylindrical lenses 3a and 3b and made to be incident on a laser medium 4. Thus, the laser medium 4 is excited (or pumped).

Namely, an angle $\theta_X$ of radiation (hereunder sometimes referred to as an emissive angle) of the horizontal (X) component $L_{1X}$ of the laser light $L_1$ emitted from the semiconductor laser 1 is different in magnitude from an emissive angle $\theta_Y$ of the vertical (Y) component $L_{1Y}$ thereof. Therefore, the horizontal (X) component $L_{1X}$ of the laser light $L_1$ is focused by the cylindrical lens 3b and on the other hand the vertical (Y) component $L_{1Y}$ is focused by the cylindrical lens 3a. Thereby, in the laser medium 4, a region $SL_{1X}$ pumped by the horizontal component $L_{1X}$ of the light $L_1$, as well as a region $SL_{1Y}$ pumped by the vertical component $L_{1Y}$ thereof, is made to be contained in a region of which the width is equal to a laser oscillation beam width (namely, a laser oscillation beam diameter) $WL_2$ and the length is equal to that L of the medium 4. Consequently, laser light having good transverse mode characteristics can be efficiently emitted. Incidentally, in FIG. 6, a reflection film 4a formed on an end surface of the laser medium 4 and an output mirror 5 arranged at the other side of the medium 4 forms a laser resonator.

However, in case of the prior art device of FIG. 6, there is necessity of regulating the optical system thereof such that the cylindrical lenses 3a and 3b are placed a predetermined distance apart and further the optical axes of these cylindrical lenses are brought in line with each other and moreover the central axes of the cylindrical surfaces (hereunder referred to as cylindrical axes) of these lenses are perpendicular to each other. Incidentally, in the instant application, an axis composed of the curvature centers of the transverse cross sections of the cylindrical surface of the cylindrical lens is referred to as a cylindrical axis of the cylindrical lens. Thus, this prior art device has drawbacks that the optical system thereof is complex and bulky and that the regulation of the optical system is complicated. Additionally, in case of this device, the number of the surfaces of lenses is larger in comparison with other prior art laser devices. Consequently, the prior art device of FIG. 6 has defects that reflection loss caused at the surfaces of lenses is increased and pumping efficiency is deteriorated. The present invention is accomplished to eliminate the above described drawbacks of the prior art device.

It is accordingly an object of the present invention to provide a solid-state laser device which can be relatively small-sized and easily regulated and emit laser light which excels in excitation (or pumping) efficiency and transverse-mode characteristics.

SUMMARY OF THE INVENTION

To achieve the foregoing object, in accordance with the present invention, there is provided a solid-state laser device which comprises a laser medium including an active material for emitting laser light when pumping light is irradiated thereon, reflecting means provided at the both sides of the laser medium having a common optical axis and composing a laser resonator, a semiconductor laser for emitting excitation (or pumping) light to be used for pumping the laser medium, of which the angle of radiation in a first plane including a line extending in the longitudinal direction of a light emitting portion of the semiconductor laser is different in magnitude from the angle of radiation in a second plane perpendicular to the first plane, and a focusing lens (namely, condenser lens) for receiving the pumping light emitted from the semiconductor laser and for focusing the received light on a region of the laser medium to be excited or pumped. Further, the solid-state laser device of the present invention employs a bi-cylindrical convexo-convex lens, of which the both surfaces are cylindrical surfaces and curves outward, as the focusing lens. Moreover, the radius of curvature of each cylindrical surface is selected such that a first region of the laser medium to be excited or pumped by a first component of the pumping light, which propagates on a plane parallel to the first plane, and a second component of the pumping light, which propagates on a plane parallel to the second plane, are contained in a predetermined region of the laser medium.

Thus, the pumping light emitted from the semiconductor laser is focused by the bi-cylindrical lens such that the first region of the laser medium to be excited or pumped by a first component of the pumping light, which propagates on a plane parallel to the first plane, and the second component of the pumping light, which propagates on a plane parallel to the second plane, are contained in the predetermined region of the laser medium. Thereby, the laser medium can be preferably pumped or excited, and output laser light which excels in transverse mode characteristics can be obtained.

In this case, as a result of the fact that the bi-cylindrical lens is employed as the focusing lens, the optical system of the solid-state laser device is relatively simple. Moreover, the reflection loss is little because of the fact that the number of the surfaces of lenses is small. Therefore, there is provided a solid-state laser device which can be relatively small-sized and easily regulated and can emit laser light which excels in excitation (or pumping) efficiency.

Further, in an embodiment of the present invention, the semiconductor laser is of what is called a broad area type.

Thereby, pumping light of which the intensity is relatively large can be obtained. Namely, the solid-state laser device of the present invention can emit such pumping light of which the intensity is relatively large.

Moreover, in another embodiment of the present invention, the semiconductor laser is a semiconductor laser array.

Thereby, the solid-state laser device of the present invention can emit pumping light of which the intensity is further large.

Furthermore, in still another embodiment of the present invention, a non-linear optical medium for converting the wavelength of original output laser light (namely, a fundamental wave to be described later) generated in the laser medium and generating laser light which is different in wavelength from the fundamental wave is provided on the optical path of the fundamental wave.

Thereby, the laser light different in wavelength from the fundamental wave can be obtained.

Additionally, in yet another embodiment of the present invention, a non-linear optical crystal for generating the fundamental wave of the laser light when the excitation (or pumping) light is irradiated thereon and for generating laser light which is different in wavelength from the fundamental wave is employed as the laser medium.

Thereby, the laser light different in wavelength from the fundamental wave can be obtained by the solid-state laser device which has a simpler configuration.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 1 is a diagram for illustrating the construction of a first solid-state laser device embodying the present invention;

FIGS. 2(a) and 2(b) are sectional views of the first laser device of FIG. 1 for illustrating the optical path thereof;

FIGS. 3(a) and 3(b) are sectional views of a second solid-state laser device embodying the present invention for illustrating the construction thereof;

FIGS. 4(a) and 4(b) are sectional views of a third solid-state laser device embodying the present invention for illustrating the construction thereof;

FIG. 5 and 5(a)-5(c) are a diagram for illustrating a semiconductor laser array; and FIGS. 5(a), 5(b) and 5(c) are successive expanded views of the circled areas in FIG. 5; and FIGS. 6(a) and 6(b) are sectional views of a prior art laser device for illustrating the construction thereof.

DETAILED DESCRIPTION OF THE PREFERRED EMBODIMENTS

Hereinafter, preferred embodiments of the present invention will be described in detail by referring to the accompanying drawings.

(1) First Embodiment

FIG. 1 is a diagram for illustrating the construction of a first solid-state laser device embodying the present invention (hereunder referred to as a first embodiment of the present invention). FIGS. 2(a) and 2(b) are sectional views of the first embodiment of FIG. 1 for illustrating the optical path thereof. Hereinafter, the first embodiment will be described in detail by referring these figures. Incidentally, in these figures, like reference characters designate like or corresponding portions of the prior art laser device of FIG. 6.

As shown in FIGS. 1, 2(a) and 2(b), at the side to which the pumping light or beam $L_1$ (of which the horizontal (X) component is represented by $L_{1X}$ of FIG. 2(b) and the vertical (Y) component is designated by $L_{1Y}$ of FIG. 2(a)) is emitted from a light emitting portion 1c of a semiconductor laser 1, a collimating lens 2, a bi-cylindrical lens 13, a laser medium 4 and an output mirror 5 are serially placed in this order such that the optical axes of the elements 1, 2, 13, 4 and 5 are brought in line with the central axis of the emitted laser beam $L_1$.

The semiconductor laser 1 is of what is called a broad area type. Further, the semiconductor laser 1 has a sandwich-like structure in which an active layer 1a intervenes clad layers 1b. The laser light $L_1$ is emitted from a band-like light emitting portion 1c placed in the central portion of an end surface (a right end surface as viewed in FIG. 1) of the active layer 1a. In case of employing an XYZ-orthogonal-axes system in which as illustrated in FIG. 1, the Z-axis is set in the direction of the central axis of the laser beam $L_1$; the X-axis in the longitudinal direction of the light emitting portion 1c (see FIGS. 2(b)) of the semiconductor laser 1; and the Y-axis in the direction perpendicular to the Z-axis and to the X-axis, the light emitting portion 1c has a large width $W_X$ of one hundred and several tens µm or so in the X-direction and a small width of several µm or so in the Y-direction. Further, an emissive angle $\theta_X$ in the direction of the X-axis of the laser light $L_1$ is smaller than an emissive angle $\theta_Y$ in the direction of the Y-axis thereof ($\theta_Y:\theta_X \approx 2:1$). For example, what is called a broad type semiconductor laser SLD303WT manufactured by Sony Corporation may be employed as the semiconductor laser 1. In this case, $W_X=160$ µm; $W_Y=3$ µm; $\theta_X=6°$; and $\theta_Y=14°$. Further, the wavelength of the emitted laser light is 809 nm and an output of the semiconductor laser is 500 mW. Incidentally, $\theta_Y$ and $\theta_X$ is expressed in terms of an HWHM (Half Width at Half Maximum) notation.

The collimating lens 2 is a convex lens of which the focal length f=4.5 mm. Further, the collimating lens 2 is positioned in the solid-state laser device such that a focal point thereof is placed on the light emitting portion 1c of the semiconductor laser 1 and is used to change the pumping laser light $L_1$ emitted from the semiconductor laser 1 into substantially parallel rays.

The bi-cylindrical lens 13 is placed nearly 5 mm away from the collimating lens 2 and has a function similar to the function of the cylindrical lenses 3a and 3b.

The surface 13a of incidence and the surface 13b of emission (namely, output) of the bi-cylindrical lens 13 are outwardly curved convex cylindrical surfaces. The cylindrical axes of the cylindrical surfaces are arranged in such a manner to intersect orthogonally with each other. Namely, as illustrated in FIG. 1, the surfaces 13a and 13b are arranged such that the cylindrical axis of the surface 13a of incidence is parallel to the X-axis and on the other hand that of the surface 13*b* of emission is parallel to the Y-axis.

Further, the radii of curvature of the surfaces 13*a* and 13*b* of the bi-cylindrical lens 13 are determined in the following manner. Namely, the surface 13*a* of incidence of the lens 13 focuses the vertical (Y) component $L_{1Y}$ of the pumping laser light $L_1$ as shown in FIG. 2(*a*). In this case, the width $W_Y$ in the vertical direction of the light emitting portion 1*c* of the semiconductor laser device 1 is several μm. Therefore, the vertical (Y) component $L_{1Y}$ can be considered as emitted from a point source. Thus, the vertical (Y) component $L_{1Y}$ is changed by the collimating lens 2 into parallel rays. In order to achieve an efficient laser pumping, a region $SL_{1Y}$ (indicated by hatching in FIG. 2(*a*)) through which the component $L_{1Y}$ passes of the laser medium 4 should be contained in a laser beam $L_2$ having an almost circular section of which the diameter is $W_{L2}$. To this end, the radius of curvature of the surface 13*a* of incidence should be determined such that an angle $\theta_1$ of convergence (namely, focusing) of the light focused by the lens action of the surface 13*a* of incidence satisfies the condition expressed by the following equation:

$$\theta_1 = (n \cdot W_{L2})/L \tag{1}$$

where L denotes the length of the laser medium 4; n the refractive index thereof; and $W_{L2}$ the width (namely, the diameter) of an output laser beam in the laser medium 4.

Further, as shown in FIG. 2(*b*), the surface 13*b* of emission (namely, output) of the lens 13 focuses the horizontal (X) component $L_{1X}$ of the pumping laser light $L_1$. In this case, the width $W_X$ in the horizontal (namely, the longitudinal) direction of the light emitting portion 1*c* of the semiconductor laser 1 is one hundred and several tens μm. Therefore, the horizontal (X) component $L_{1X}$ should be considered as emitted from a large number of point sources arranged in the direction of the X-axis. Thus, the horizontal (X) component $L_{1X}$ is not changed into parallel rays after passes through the collimating lens 2. Thus, the horizontal (X) component $L_{1X}$ is not focused at a point even after it is subject to the lens action of the collimating lens 2. Namely, light emitted from the neighborhood of the optical axis of the light emitting portion 1*c* is focused at the neighborhood of the optical axis of the laser medium 4. In contrast, light emitted from the neighborhood of each of the ends of the light emitting portion 1*c* is focused on a ring portion forming a contour of a spot of which the diameter is $S_X$. Therefore, in this case, the width (or the diameter) $S_X$ of the spot should be smaller than that $W_{L2}$ of the output laser beam in the laser medium 4. Moreover, the radius of curvature of the surface 13*b* of emission (namely, output) should be determined in such a manner to obtain an angle $\theta_2$ of convergence (namely, focusing) by which a region $SL_{1X}$ (indicated by hatching in FIG. 2(*b*)), through which the component $L_{1X}$ passes, of the laser medium 4 is contained in the region of which the width is equal to the diameter $W_{L2}$ of the output laser beam and the length is equal to that L of the laser medium 4.

In this embodiment, BK7 is employed as the material of the bi-cylindrical lens. Further, the radius of curvature of the surface 13*a* of incidence is about 6 mm and that of curvature of the surface 13*b* of emission is nearly 3 mm. Furthermore, the distance l between the surfaces 13*a* and 13*b* is approximately 10 mm. Moreover, the angle $\theta_1$ of convergence (namely, focusing) of the vertical (Y) component $L_{1Y}$ of the pumping laser light $L_1$ is 5° or so and the angle $\theta_2$ of convergence (namely, focusing) of the horizontal (X) component $L_{1X}$ thereof is 6° or so.

The laser medium 4 is placed about 4 mm apart from the bi-cylindrical lens 13. In this embodiment, the laser medium 4 is a cylindrical laser rod which is 3 mm in diameter and is 5 mm in length and is made of Nd:YAG-($Y_3Al_5O_{12}$) (incidentally, the concentration of Nd ions is about 1.1 atomic %). Further, a reflecting member 4*a* which composes a laser resonator together with the output mirror 5 is attached to an end surface (a left end surface thereof as viewed in FIGS. 1 and 2) of the laser medium 4. A dielectric film capable of transmitting 90% or more of the pumping light $L_1$ of which the wavelength is 809 nm and reflecting 99% or more of the laser light $L_2$ generated in the laser medium 4, of which the wavelength is 1064 nm, may be employed as the reflecting member 4*a*. Further, the diameter $W_{L2}$ of the cylindrical pumped region of the laser medium 4 is around 200 μm and the width $S_X$ of the "waist" of the laser beam is about 160 μm.

The output mirror 5 is fabricated by first shaping a concave-lens-like body made of a transparent member such as glass and next forming a dielectric multi-layer film on a concave surface of the concave-lens-like body as a reflecting surface. The reflectivity of this reflecting surface is about 97% in case of reflecting the laser light of which the wavelength is 1064 nm. Further, the radius of curvature of the concave surface is determined by using a well-known technique such that a most suitable resonator is formed by the output mirror 5 and the reflecting member 4*a*. In this embodiment, the optical cavity length (namely, the optical distance (i.e., the optical path length) between the reflecting member 4*a* and the output mirror 5) is 20 mm and the radius of curvature of the concave surface is 25 mm.

In case of this embodiment, the pumping laser light $L_1$ emitted from the semiconductor laser 1 is focused by the bi-cylindrical lens 13 such that a region $SL_{1X}$ pumped by the component $L_{1X}$, which propagates on a plane parallel to the first plane, of the light $L_1$, as well as a region $SL_{1Y}$ pumped by the component $L_{1Y}$ thereof which propagates on a plane parallel to the second plane, is made to be contained in the predetermined region of the laser medium 4. Thereby, the laser medium 4 is preferably pumped or excited so as to cause laser oscillation. Consequently, laser light having good transverse mode characteristics can be obtained.

In case of this embodiment, the bi-cylindrical lens 13 is employed as a focusing lens as above described. Thus, the optical system of this embodiment is relatively simple. Moreover, the reflection loss is little because of the fact that the number of surfaces of lenses is small. Thus, the intensity of the output laser light $L_2$ is 1.2 times that of the output laser light obtained by the prior art solid-state laser device of which the construction is the same as of the first embodiment of the present invention except that the prior art solid-state laser device employs the cylindrical lenses 3*a* and 3*b* instead of the bi-cylindrical lens 13. Furthermore, as a result of the use of the bi-cylindrical lens as a focusing lens, the device can be made to be relatively small-sized. Namely, the size of the first embodiment of the present invention can be reduced to nearly half of that of the prior art solid-state laser device. Additionally, in case of this embodiment, the positional relation between the collimating lens 2 and the bi-cylindrical lens 13 can be relatively flexibly established. Thus, the full performance of this embodiment can be obtained by fixing the collimating lens 2 and the bi-cylindrical lens 13 on a simple holder which does not have an adjusting mechanism by using a simple technique such as adhesion.

(2) Second Embodiment

FIGS. 3(a) and 3(b) are sectional views of a second solid-state laser device embodying the present invention (namely, a second embodiment of the present invention) for illustrating the construction thereof. Incidentally, there are many composing elements common to the first and second embodiments. Therefore, in FIGS. 3(a) and 3(b), like reference characters designate like or corresponding portions, of which the explanations are omitted for simplicity of description, of the first embodiment.

Further, the second embodiment differs from the first embodiment in that a non-linear optical element 21 is provided between the laser medium 4 and the bi-cylindrical lens 13 and an external reflecting mirror 22 is provided between the non-linear optical element 21 and the bi-cylindrical lens 13. The external reflecting mirror 22 is employed in place of the reflecting member 4a for composing a laser resonator formed on an end surface of the laser medium 4 of the first embodiment. Incidentally, in FIGS. 3(a) and 3(b), the output mirror 5 which is the other of the composing elements of the laser resonator is not shown.

The non-linear optical element 21 is used to perform what is called a sum frequency mixing (or sum frequency generation) by using pumping laser light $L_1$ and output laser light (hereunder referred to as fundamental wave) $L_2$ to generate modulated laser light $L_3$. Incidentally, in the instant application, original output laser light $L_2$ is referred to as a fundamental wave for the purpose of distinguishing it from laser light $L_3$ obtained by effecting the sum frequency mixing. The sum frequency mixing is a phenomenon of generating third laser light having the frequency $W_3 = W_1 + W_2$ from first laser light having the frequency $W_1$ and second laser light $W_2$ by using a non-linear optical effect.

Further, for instance, a KTP ($KTiOPO_4$) crystal is employed as the non-linear optical element 21. In case where Nd:YAG is used as the laser medium 4, the wavelength of the emitted output laser light (namely, the fundamental wave) $L_2$ is 1064 nm. On the other hand, the wavelength of the pumping laser light $L_1$ is 809 nm. Therefore, the wavelength of the third laser light generated by the sum frequency mixing is 459 nm. Incidentally, the KTP crystal is formed in a direction suitable for performing the sum frequency mixing, namely, in the direction satisfying phase matching conditions.

In this case, when effecting the sum frequency mixing, it is important to improve the matching of beam shapes of the pumping laser light $L_1$ and the fundamental wave $L_2$ in the inside of the non-linear optical element. In case where the beam shapes of the pumping laser light $L_1$ and the fundamental wave $L_2$ are different from each other due to, for example, the fact that the beam shape of the focused pumping laser light $L_1$ is distorted, an output of the laser light $L_3$ obtained by the sum frequency mixing is decreased and moreover the beam shape is deteriorated owing to the influence of the beam shape of the pumping laser light and transverse mode characteristics are deteriorated.

In case of this embodiment, the bi-cylindrical lens 13 is employed, with the result that the beam shape of the pumping laser light $L_1$ can be exactly matched with that of the fundamental wave $L_2$ by separately shaping the X-component beam and the Y-component beam of the pumping laser light $L_1$ into predetermined shapes. As the result of the sum frequency mixing, laser light $L_3$ (hereunder referred to as sum-frequency-mixing laser light) which has a preferable beam shape and excels in transverse mode characteristics and has large intensity can be obtained.

Incidentally, in case of this embodiment, the laser medium 4 and the non-linear optical element 21 are made by using different members. These elements, however, can be constructed as one member by employing an optical element (for example, a crystal of NYAB ($Nd_xY_{1-x}Al_3(BO_3)_4$ or Nd:MgO:LiNbO_3$) which has the both functions of the laser medium and the non-linear optical crystal. Note that by replacing the laser medium 4 of the first embodiment with such a non-linear optical crystal, a solid-state laser device having the functions similar to those of the second embodiment and the construction simpler than that of the second embodiment can be obtained. It goes without saying that even in such a case, the phase matching conditions of the non-linear optical crystal should be satisfied.

In addition, higher harmonics (namely, higher-order harmonic waves) of the fundamental wave L instead of the sum-frequency-mixing laser light $L_3$ can be obtained by placing another type of a non-linear optical crystal such as a crystal of KTP between the laser medium 4 and the output mirror 5 of the first embodiment.

Incidentally, in each case of the first and second embodiments, the emissive angles $\theta_X$ and $\theta_Y$ are relatively large. In contrast, in case where the emissive angles $\theta_X$ and $\theta_Y$ are small, the collimating lens 2 may be omitted.

(3) Third Embodiment

FIGS. 4(a) and 4(b) are sectional views of a third solid-state laser device embodying the present invention (hereunder referred to as a third embodiment) for illustrating the construction thereof. Further, FIG. 5 is a diagram for illustrating a semiconductor laser array. Hereinafter, the third embodiment of the present invention will be described by referring to these figures. Incidentally, there are many composing elements common to the first and third embodiments. Therefore, in FIGS. 4(a) and 4(b), like reference characters designate like or corresponding portions, of which the detailed explanations are omitted for simplicity of description, of the first embodiment.

Further, the primary differences between the first and third embodiments reside in that the third embodiment employs a semiconductor laser array 10 in place of the semiconductor laser device 1 as a laser source and that the third embodiment employs a GRIN lens array 20 instead of the collimating lens 2.

As shown in FIG. 5, the semiconductor laser array 10 has a sandwich-like structure in which an active layer 10a intervenes two clad layers 10b. Further, many micro light emitting portions 10c are formed like an array on an end surface of the active layer 10a. The width $W_{X2}$ in the direction of the X-axis and the width $W_Y$ in the Y-direction of micro light emitting portion 10c are several $\mu$m. A unit emission portion 10d is composed of about 10 micro light emitting portions 10c arranged on a line of which the width $W_{X1}$ is approximately 100 $\mu$m. Further, many groups of unit emission portions 10d are placed at intervals of about 100 μm on a line of which the width $W_X$ is about 10 mm. Such an arrangement of an emission portion subdivided unit emission portions is employed for the purpose of efficiently radiating heat generated during laser oscillation and making the laser device last long and improving the reliability thereof. The range of the wavelength of light emitted by the semiconductor laser array 10 is extremely broad in comparison with that of the wavelength of light emitted by the semiconductor laser 1. Thus, it is difficult to change the laser light $L_1$ emitted by the semiconductor laser array 10 into parallel rays by focusing the light $L_1$ by an ordinary convex lens. Therefore, the GRIN lens array 20 is used in place of the collimating lens 2.

The GRIN lens array 20 is formed by uniting many unit GRIN lenses (cylindrical lenses) arranged like an array, of which the refractive indexes change in the radial direction from the cylindrical axis to the outside. The GRIN lens array 20 of this embodiment is formed by cutting many unit GRIN lenses like rectangular prisms and then uniting the unit GRIN lenses. In FIGS. 4(a) and 4(b), the GRIN lens array 20 is illustrated such that the cylindrical axis thereof is parallel to the Z-axis. Thereby, each unit GRIN lens can collimate the laser light $L_1$ emitted from the emission portion 10d of the semiconductor laser array independent of the other unit GRIN lenses. This is because each of the emission portions 10d can be considered as a semiconductor laser device of which the width in the direction of the Y-axis is $W_Y$ and that in the direction of the X-axis is $W_X$.

In case of this embodiment, the width in the X-direction of the light emitting portion is extremely wide in comparison with that of the light emitting portion of the first embodiment (namely, the former is several tens or more times the latter). Thus, the beam shape of the laser light having passed through the GRIN lens array 20 is wide in the direction of the X-axis and narrow in the direction of the Y-axis. Therefore, in order to change the beam shape of the pumping laser light $L_1$ into a cylindrical shape, the X-component of the laser beam $L_1$ should be focused by the surface 13a of incidence of the cylindrical lens 13 and in contrast the Y-component of the laser beam $L_1$ should be focused by the surface 13b of emission of the lens 13. As a result, the bi-cylindrical lens 13 is placed at the position determined by rotating the position thereof in cases of the first and second embodiments 90° round the optical axis of the solid-state laser device.

Further, in case of this embodiment, the semiconductor laser array 10 is employed as a source of the pumping laser light. Thus, it is difficult to design the bi-cylindrical lens 13 such that the pumping laser light $L_1$ has an ideal beam shape. However, the beam shapes of the pumping laser light and the fundamental wave can be matched with each other to the extent sufficient to use this embodiment for ordinary purposes. Moreover, the pumping light of which the intensity is large can be obtained. Thus, this embodiment is very effective in case of making much of the intensity of light emitted form the laser medium 4.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A solid-state laser device having a laser medium including an active material for emitting laser light when pumping light is irradiated thereon, reflecting means provided at the both sides of the laser medium having a common optical axis and composing a laser resonator, a semiconductor laser for emitting pumping light to be used for pumping the laser medium, of which the angle of radiation in a first plane including a line extending in the longitudinal direction of a light emitting portion of the semiconductor laser is different in magnitude from the angle of radiation in a second plane perpendicular to the first plane, and a focusing lens for receiving the pumping light emitted from the semiconductor laser and for focusing the received light on a region of the laser medium to be excited or pumped, wherein
  a bi-cylindrical convexo-convex lens, of which the both surfaces are cylindrical surfaces and curve outward, is employed as the focusing lens and wherein the radius of curvature of each cylindrical surface is selected such that a first region of the laser medium to be excited or pumped by a first component of the pumping light, which propagates on a plane parallel to the first plane, and a second component of the pumping light, which propagates on a plane parallel to the second plane, are contained in a predetermined region of the laser medium.

2. A solid-state laser device as set forth in claim 1, wherein the semiconductor laser is of what is called a broad area type.

3. A solid-state laser device as set forth in claim 1, wherein the semiconductor laser is a semiconductor laser array.

4. A solid-state laser device as set forth in claim 1, wherein a non-linear optical medium for converting the wavelength of a fundamental wave generated in the laser medium and generating laser light which is different in wavelength from the fundamental wave is provided on the optical path of the fundamental wave.

5. A solid-state laser device as set forth in claim 1, wherein a non-linear optical crystal for generating the fundamental wave when the pumping light is irradiated thereon and for generating laser light which is different in wavelength from the fundamental wave is employed as the laser medium.

6. A solid-state laser device as set forth in claim 3, wherein a non-linear optical medium for converting the wavelength of a fundamental wave generated in the laser medium and generating laser light which is different in wavelength from the fundamental wave is provided on the optical path of the fundamental wave.

7. A solid-state laser device as set forth in claim 3, wherein a non-linear optical crystal for generating the fundamental wave when the pumping light is irradiated thereon and for generating laser light which is different in wavelength from the fundamental wave is employed as the laser medium.

8. A solid-state laser device as set forth in claim 4, wherein the non-linear optical medium is made of $KTiOPO_4$.

9. A solid-state laser device as set forth in claim 6, wherein the non-linear optical medium is made of $KTiOPO_4$.

10. A solid-state laser device as set forth in claim 5, wherein the non-linear optical crystal is a crystal of $Nd_xY_{1-x}Al_3(BO_3)_4$.

11. A solid-state laser device as set forth in claim 7, wherein the non-linear optical crystal is a crystal of $Nd_xY_{1-x}Al_3(BO_3)_4$.

12. A solid-state laser device as set forth in claim 5, wherein the non-linear optical crystal is a crystal of $Nd:MgO:LiNbO_3$.

13. A solid-state laser device as set forth in claim 7, wherein the non-linear optical crystal is a crystal of $Nd:MgO:LiNbO_3$.

* * * * *